United States Patent [19]

Messerly

[11] 3,983,919
[45] Oct. 5, 1976

[54] HIGH-MODULUS RUBBER COMPOSITION FOR PNEUMATIC TIRES

[75] Inventor: James W. Messerly, Stow, Ohio

[73] Assignee: The B. F. Goodrich Company, Akron, Ohio

[22] Filed: Oct. 9, 1974

[21] Appl. No.: 513,414

[52] U.S. Cl. .................. 152/357 R; 152/361 R; 152/362 R; 260/23.7 M; 260/42.31; 260/42.32

[51] Int. Cl.² .................. B60C 9/02; C08K 3/04; C08L 91/00

[58] Field of Search ........ 260/42.31, 42.32, 23.7 M, 260/23.7 R, 94.2 M, , 752, 754; 152/330 R, 357 R

[56] References Cited
UNITED STATES PATENTS

| | | |
|---|---|---|
| 2,582,795 | 1/1952 | Prentiss et al. ............. 260/23.7 M |
| 2,891,926 | 6/1959 | Doak ........................ 260/42.31 |
| 3,514,370 | 5/1970 | Canevari ................... 260/23.7 M |

Primary Examiner—Lewis T. Jacobs
Assistant Examiner—H. H. Fletcher
Attorney, Agent, or Firm—William A. Shira, Jr.

[57] ABSTRACT

A tire designed for operation both as a pneumatic tire under ordinary conditions, and also without inflation under emergency conditions, has thick sidewalls made of low-hysteresis high-modulus vulcanized natural rubber composition containing reinforcing carbon black and also containing an effective anti-oxidant, together with a cobalt soap to prevent reduction in modulus during service of the tire.

12 Claims, 1 Drawing Figure

U.S. Patent  Oct. 5, 1976  3,983,919
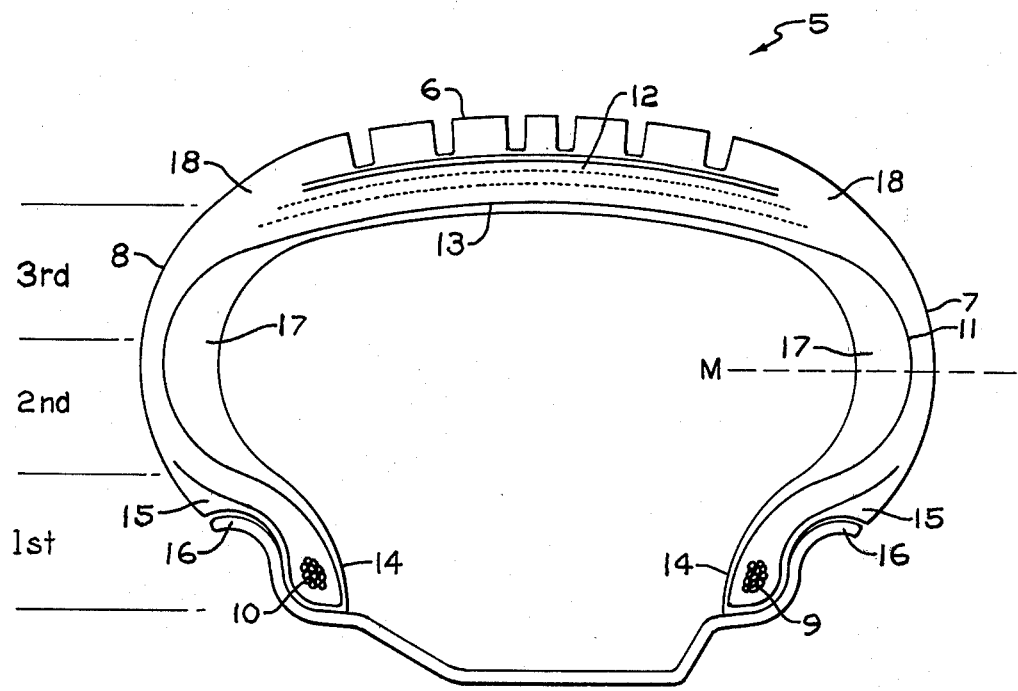

HIGH-MODULUS RUBBER COMPOSITION FOR PNEUMATIC TIRES

CROSS REFERENCE

This invention is especially useful in the pneumatic tire of the application for patent of John T. Alden, Michael G. Miller, and Stephen C. Sabo Ser. No. 513,413 filed Oct. 9, 1974 and assigned to the same owner as this application.

BACKGROUND

Pneumatic tires are subject to failure from loss of air because of punctures, blowouts, or spontaneous leaks and then generally collapse. As a consequence, they are then likely to be severely damaged by rim cutting, or chafing, or breakage of cords, so that they are unsuitable for further use. Many efforts have been made to protect tires against such damage by use of auxiliary devices to prevent collapse. Such devices are expensive, cumbersome, and generally not completely successful.

It has now been found that with relatively small modification of structure pneumatic tires can be provided which will not collapse completely when inflation air is lost, and which therefore permit the user of a motor vehicle to continue to operate it without the need for changing tires at the roadside. Such tire constructions generally involve some kind of stiffening of the sidewall of the tire to minimize the amount of flexure which results from imposition of the weight of the vehicle on the tire in the absence of normal inflation pressure.

One form of such tires is described, for example, in the copending application for patent mentioned above. However, a requirement for successful performance of such a tire, both in the presence and absence of inflation air, is that the sidewall material, which undergoes the most severe deflection, be made of an elastomeric material having a high modulus of elasticity and a low hysteresis. Rubber compositions having this particular combination of properties have tended to change substantially during their service life so that a tire which could perform satisfactorily when new might not do so after it had been in use for some months or years.

The principal object of this invention, accordingly, is to provide a rubber composition of permanently high modulus and low hysteresis for use in the sidewalls of tires designed for operation both with and without inflation air.

SUMMARY OF THE INVENTION

In accordance with this invention, a rubber composition is provided for the sidewalls of tires intended for use on motor vehicles both with and without presence of inflation air. This composition is made essentially from natural rubber or from the synthetic cis-polyisoprene rubber, which is chemically identical with natural rubber, or from blends of such materials. The rubber is mixed with a substantial proportion of reinforcing carbon black and preferably also with a small proportion of a heat settable phenolic resin such as that produced by mixing resorcinol with hexamethylene tetramine. In addition, it contains conventional vulcanizing agents and antioxidants or antiozonants.

Compositions containing the foregoing ingredients are well known and provide satisfactory initial properties after vulcanization. However, natural rubber, after prolonged exposure to heat, undergoes reversion, which means that the initial stiff high-modulus vulcanized material gradually softens and exhibits lower and lower modulus values approaching that of the original unvulcanized crude rubber, which ultimately are too low for satisfactory support of the weight by an uninflated tire. Other elastomers are known which do not undergo reversion, such as the butadiene-styrene rubbers which are extensively used in making tires for passenger cars and other lightweight vehicles, but such synthetic rubber materials have such a high hysteresis that the intense flexure resulting from operation without inflation air can result in rapid overheating and consequent destruction of the tire.

I have found that a composition which performs satisfactorily both when freshly vulcanized and after long service, maintaining its high modulus and low hysteresis without significant change, can be made from natural rubber or its true synthetic duplicate containing the conventional materials mentioned above, together with a small proportion of a cobalt compound, preferably a cobalt soap, such as cobalt stearate.

Cobalt compounds are well known as cross-linking promoters and are extensively used as paint driers and as catalysts for the setting of various kinds of synthetic resins. They have generally been rigorously avoided in rubber compounding because of their known ability to induce rapid oxidation and consequent early failure of rubber.

Surprisingly, I have found that a suitable proportion of cobalt soap, together with adequate quantities of highly active antioxidants, will produce a stable natural rubber composition in which the oxidative cross-linking appears to take place at such a slow rate as just to offset or balance the rupture of polymer chains which is considered to be the cause of reversion of vulcanized natural rubber.

THE DRAWING

The accompanying drawing shows a cross section of a tire of the kind for which the rubber composition of this invention is especially intended.

DETAILED DESCRIPTION

The composition of this invention may be used in the sidewalls of any pneumatic tire of the type in which the weight of the vehicle is borne entirely on the sidewalls without collapse of the tread against the rim, but it is particularly intended to be used in making the type of tire described in the copending application mentioned above.

A specific tire of this kind is illustrated in cross section in the accompanying drawing, in which the tire 5 consists of a tread 6 and a pair of sidewalls 7 and 8 extending from the tread 6 to the annular beads 9 and 10. The tire 5 is reinforced by a conventional nearly inextensible textile or metal cord ply 11 which may have the individual cords located in radial planes. The cord ply 11 extends from bead 9 to bead 10 and as is usual is folded around the beads and outward into the sidewall rubber.

A belt structure 12 is placed between the crown portion 13 of the cord ply 11 and the tread rubber 6. The belt is of any conventional construction which is essentially inextensible circumferentially and provides adequate lateral stiffness, such as a combination of steel cord plies and textile cord plies at opposite small angles to the midplane of the tire, under the entire width of the tread.

The main reinforcing ply 11 is embedded throughout in rubber so that there is a layer of rubber inside the ply 11 and another layer of rubber outside of the ply 11.

The tire differs from conventional pneumatic tires in having sidewalls of substantially increased thickness, approaching or even equalling the thickness of the tread. In addition, the reinforcing ply 11 is not uniformly distant from the surfaces as is usual.

The cord ply 11 near the beads 9 and 10 is quite close to the inner surface 14, which in a tubeless tire is the air-retainng liner layer. The outer surface opposite the beads 9 and 10 is only thick enough to embed the part of ply 11 which is wrapped around the bead and any textile finishing strip which might or might not be present. However, the sidewall immediately beyond the tip of the rim flange 16 is greatly thickened on the outside and contoured to rest against the tip of rim flange 16. This is in the zone of the sidewall marked 1st in the drawing.

Following ply 11 outward away from beads 9 and 10, its position in the sidewall shifts so that it is much closer to the outside than to the inside in the midzone marked 2nd. This results in presence of a thick layer 17 of sidewall rubber inside of cord ply 11.

As the cord ply 11 extends still further outward away from beads 9 and 10 and closer to tread 6, its position shifts back to a location close to the inner surface. This results in presence of a thick layer of rubber at each shoulder 18, outside of cord ply 11, in the zone marked 3rd in the drawing.

The consequence of the foregoing construction is that a wheel load on the tire when it is uninflated imposes a radially inward force on each sidewall 7 and 8, tending to fold the sidewalls sharply at the radial midpoint M of the sidewall. Since the cord ply 11 is substantially inextensible, this force tends to compress the 1st zone of outer sidewall rubber between the cord ply 11 and the tip 16 of the rim flange. It also tends to compress strongly the inner sidewall rubber 17 in the 2nd zone at the location of the midpoint M, and conversely to compress the outer shoulder rubber 18 in the 3rd zone.

Considerable cyclic compression and relaxation occurs in such a tire when operated while properly inflated, and minimum hysteresis is therefore very important. Since the compression is greatly intensified when operated after internal air pressure is lost, minimum hysteresis is of critical importance under such emergency conditions to avoid destructive temperature rise.

The retention of the initial high modulus is equally important since it minimizes the extent of the cyclic compression and relaxation under a given load and therefore plays an auxiliary role in minimizing heat generation.

The new tire sidewall composition of this invention may be prepared from 100 parts by weight of true natural rubber or the synthetic duplicate of natural rubber, together with about 35 to 50 parts of reinforcing carbon black, and conventional vulcanizing agents, such as 1.5 parts sulfur, 2 parts dithio dimorpholine, 1.5 parts cyclohexyl benzothiazyl sulfenamide, and 10 parts zinc oxide. The composition must also contain highly active antioxidants or antiozonants, such as 0.25 parts diphenyl p-phenylene diamine, 0.7 parts diphenylamine-acetone reaction product, and 2 parts dimethyl butylphenyl p-phenylene diamine. Preferably it contains also a small proportion of heat setting resin such as phenolic resin which most advantageously is a resorcinol formaldehyde resin such as is produced by incorporation of 2.5 parts resorcinol and 1.6 parts hexamethylene tetramine, which functions as a formaldehyde donor. To these ingredients is added 6 parts cobalt stearate or an equivalent active cobalt compound such as cobalt naphthenate.

Experience has indicated that the synthetic duplicate of natural rubber, cis-polyisoprene, does not quite match natural rubber in strength, and it is therefore preferred to use all natural rubber, or a major proportion of natural rubber blended with a minor proportion of synthetic cis-polyisoprene. For example, a suitable elastomer base may be a natural rubber blend of ribbed smoked sheets with brown blankets, plasticated, and then further mixed with one-half its weight of synthetic cis-polyisoprene of 75 to 90 Mooney viscosity. Unless qualified, "cis-polyisoprene" is used to designate both natural rubber and its synthetic equivalent.

The carbon black may be any of the reinforcing blacks such as channel black or high abrasion furnace black, but best results are presently obtained with a moderately high proportion of a high-modulus black, such as 40 parts of superior processing furnace black which produces a desirably high modulus without undue increase in hysteresis.

The particular combination of vulcanizing materials mentioned above gives excellent results, but a great many other materials are available and may be substituted if the compounder has had good experience in using them to produce vulcanized products of stable physical properties. However, sulfur or sulfur-donors are presently preferred for vulcanization, with a sulfenamide type accelerator and a fairly high proportion of zinc oxide.

Softeners such as oils, fusible resins, and fatty acids should be avoided as far as possible since they tend to offset or detract from the essential high modulus of the rubber sidewall compositions.

The combination of highly active antioxidants with a cobalt compound is important to success of the invention, since insufficient antioxidant could result in resinification of the rubber by the catalytic action of the cobalt, and insufficient cobalt could result in achievement of an inadequate balance between the normal reversion and the cross-linking induced by the cobalt. With the highly active substituted phenylene diamine antioxidants or their equivalents, not less than about 4 to 5 parts of cobalt stearate should be used and not more than about 8 parts. The solid cobalt stearate is preferred over other available active cobalt compounds such as liquid cobalt naphthenate, since the stearate is a solid and therefore has a minimum softening effect on the vulcanized rubber composition.

The composition as described above performs extremely well under normal service conditions as the sidewall material in the type of tire having a thick sidewall. Also, because of its peculiar combination of high modulus and low hysteresis, it performs very well without inflation air, if the sidewall is properly proportioned, permitting operation of such a tire for many miles at reasonably high speeds without production of destructive sharp folds, and without overheating.

Accelerated aging of such compositions by subjection to high temperatures for a considerable time results in slight reduction in stength but in maintenance of high modulus of elasticity and low hysteresis without essential change. Accordingly, this essential combination of properties, lasting throughout the normal life of the tire, which has not been heretofore readily available, is now available for use in the new type of pneumatic tires designed for emergency operation in the event of loss of inflation air, without collapse of the tire against the rim.

I claim:

1. A high-modulus, low-hysteresis, stable, vulcanized, tire composition consisting essentially of vulcanized cis-polyisoprene rubber containing a high-modulus carbon black, about 4 to 8 parts, per hundred of rubber, of an active cobalt compound, and an effective quantity of an efficient antioxidant.

2. A tire composition as in claim 1, in which the cobalt compound is a cobalt soap of a fatty acid.

3. A tire composition as in claim 2, in which the cobalt compound is cobalt stearate.

4. A tire composition as in claim 1, in which the carbon black is superior processing furnace black.

5. A tire composition as in claim 1, in which the antioxidant includes an N-substituted p-phenylene diamine.

6. A tire composition as in claim 1, including a heat setting phenolic resin.

7. A tire composition as in claim 6, in which the phenolic resin is a resorcinol formaldehyde resin.

8. A tire composition as in claim 7, in which the cobalt compound is cobalt stearate and the antioxidant includes an N-substituted p-phenylene diamine.

9. A tire composition as in claim 8, in which the major part of the cis-polyisoprene is natural rubber.

10. A tire with a sidewall comparable in thickness to the tread, which sidewall consists of the composition defined in claim 1.

11. A tire with a sidewall comparable in thickness to the tread, which sidewall consists of the composition defined in claim 9.

12. A tire as in claim 11, containing a ply of reinforcing cords, in which the major part of the thickness of the middle zone of the sidewall is between the reinforcing cord ply and the inner surface of the tire.

* * * * *